US007456677B1

(12) United States Patent
Rao et al.

(10) Patent No.: US 7,456,677 B1
(45) Date of Patent: Nov. 25, 2008

(54) FRACTIONAL GAIN CIRCUIT WITH SWITCHED CAPACITORS AND SMOOTHED GAIN TRANSITIONS FOR BUCK VOLTAGE REGULATION

(75) Inventors: Arun Rao, Rocklin, CA (US); John Philip Parry, Grass Valley, CA (US); William J. McIntyre, Wheatland, CA (US); Nathanael Griesert, Grass Valley, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 71 days.

(21) Appl. No.: 11/381,101

(22) Filed: May 1, 2006

(51) Int. Cl.
*G05F 1/10* (2006.01)
(52) U.S. Cl. ........................ 327/536; 327/538
(58) Field of Classification Search ......... 327/536–538, 327/540, 541, 544, 546
See application file for complete search history.

(56) References Cited

U.S. PATENT DOCUMENTS

| 4,205,369 | A | * | 5/1980 | Asano .................. 363/62 |
| 6,055,168 | A | | 4/2000 | Kotowski et al. |
| 6,169,673 | B1 | | 1/2001 | McIntyre et al. |
| 6,198,645 | B1 | | 3/2001 | Kotowski et al. |
| 6,304,007 | B1 | * | 10/2001 | Yu .................. 307/110 |
| 6,456,513 | B2 | * | 9/2002 | Saito .................. 363/59 |
| 6,563,235 | B1 | | 5/2003 | McIntyre et al. |
| 6,753,623 | B2 | | 6/2004 | McIntyre et al. |
| 7,279,957 | B2 | * | 10/2007 | Yen .................. 327/536 |

OTHER PUBLICATIONS

Schuessler, J.E., "Efficiency and Power Utilization Data Guide DC/DC Conversion Choices in Battery Operated Devices," National Semiconductor Management, Wireless Sympoisum/Portable Deisgn, pp. 1-6 (1999).
Witt, J., "Switched-Capacitor Regulator Provides Gain," EDN Design Ideas, pp. 1-2, http://www.edn.com/archives/1998/031398/06di.pdf.

* cited by examiner

*Primary Examiner*—Lincoln Donovan
*Assistant Examiner*—Hai L. Nguyen
(74) *Attorney, Agent, or Firm*—Darby & Darby PC; Scott Tobias

(57) ABSTRACT

A switch array circuit that enables voltage regulation by bucking a relatively larger input voltage as it declines over time with different fractional gains that are based on different gain phase arrangements for a plurality of capacitors. A common rest phase is provided during the switching between the different gain phases. The rest phase inherently enables power to be conserved during gain transitions. Increasingly larger fractional gain phases (less buck) is provided as the input voltage declines over time, e.g., from ⅓ to ⅖ to ½ to ⅔ to unity, and the like. Also, the common rest phase for the plurality of capacitors is arranged to minimize fluctuation of the output voltage during switching between phases to generate a selected gain from the gain phase. Additionally, the common rest phase conserves/stores energy during switching transitions between multiple gain phases. The stored energy in the common rest phase can be subsequently reused in the gain phases.

24 Claims, 16 Drawing Sheets

FRACTIONAL GAIN CIRCUIT WITH SWITCHED CAPACITORS AND SMOOTHED GAIN TRANSITIONS FOR BUCK VOLTAGE REGULATION

FIELD OF THE INVENTION

The invention is generally directed to the field of voltage regulation, and more particularly to buck voltage regulation based on fractional gain switching of capacitors.

BACKGROUND OF THE INVENTION

The relatively low voltages employed to power many electronic components are often less than the output voltages of their respective power supplies. For example, some electronic components, such as processors can operate on 1.5 Volts or less, even though their power supplies may provide 3.0 volts or more. Also, many mobile devices conserve energy by including a considerable percentage of electronic components that are powered by voltages that are often substantially less than the terminal voltage of the battery.

A voltage regulating circuit for a battery often bucks (reduces) the battery's terminal voltage with an arrangement of components that provide a fractional gain (less than unity). Also, as a battery discharges and the terminal voltage declines over time, voltage regulation is often provided by switching these components into different phases to provide different fractional gains, e.g., ½, ⅓, ⅖, and the like. For example, a fully charged Lithium Ion battery typically provides a terminal voltage of 4.2 volts or less. Thus, a voltage regulating circuit for a Lithium Ion battery that powers a mobile device would both buck the battery's terminal voltage with a fractional gain and switch to different fractional gains (⅓ to ⅖ to ½, and the like) as the terminal voltage declines over time.

In the past, buck voltage regulating circuits have often used inductive components. However, an inductor produces a relatively large electromagnetic field that can interfere with the operation of radio frequency components included in many mobile devices. Also, the relatively large size of an inductive component can significantly contribute to the cost of manufacturing a voltage regulating circuit.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

DETAILED DESCRIPTION OF THE INVENTION

Figure 1A:
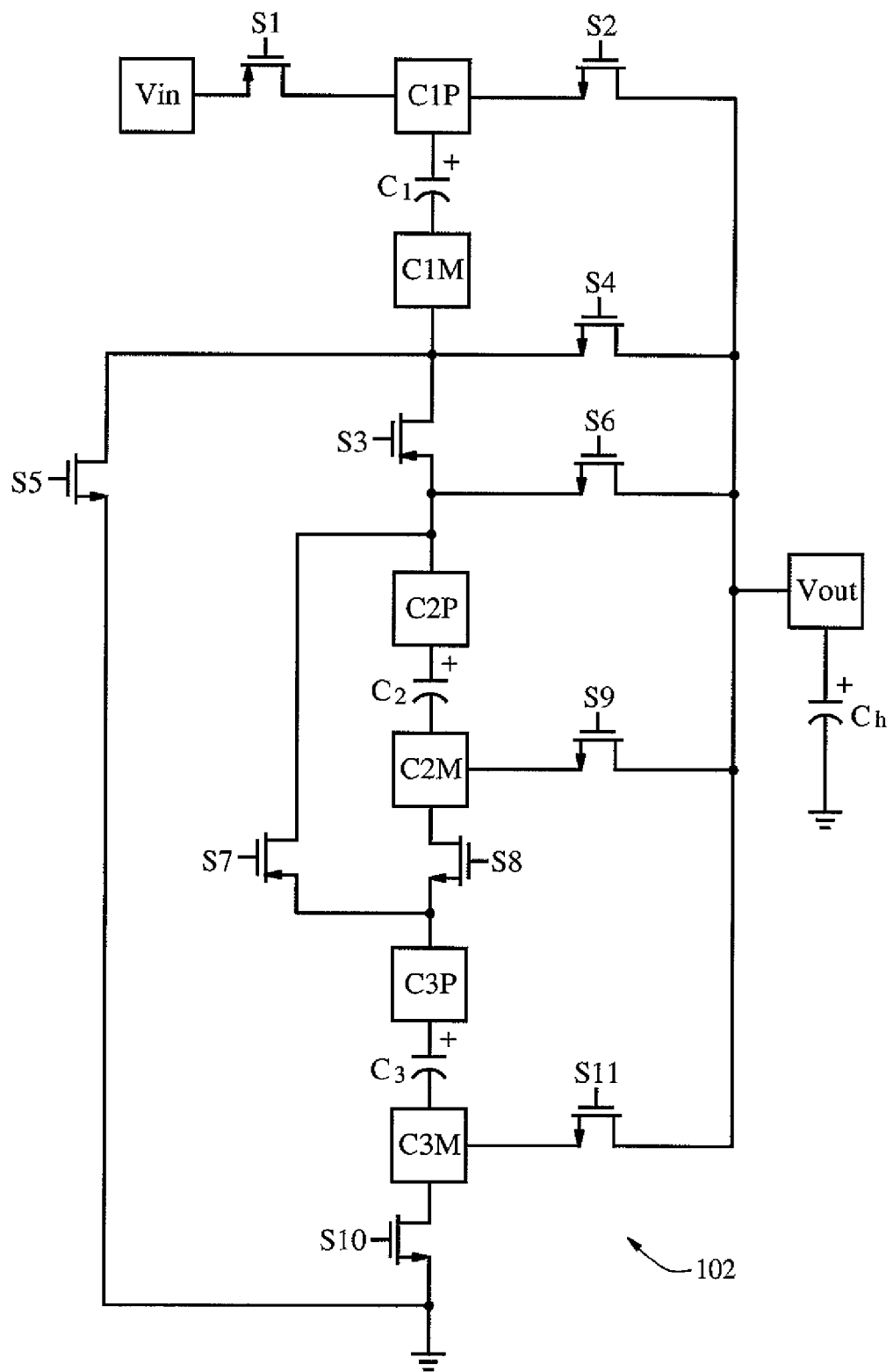
FIG. 1A illustrates an exemplary circuit in accordance with a first embodiment.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly, the invention is directed to providing a regulated output voltage based on a relatively larger input voltage that decreases over time, such as a declining terminal voltage of a battery that is discharging from use. The invention employs a switch array circuit to buck a relatively larger input voltage as it declines over time with different fractional gains that are based on different gain phases for a plurality of capacitors. A common rest phase is provided during the switching between the different gain phases. The rest phase inherently enables power to be conserved during gain transitions. Typically, the invention provides for transitioning to increasingly larger fractional gain phases (less buck) as the input voltage declines over time, e.g., from ⅓ to ⅖ to ½, and the like. Also, the common rest phase for the plurality of capacitors is arranged to minimize fluctuation of the output voltage during switching between phases to generate a selected gain from the gain phase. Additionally, the common rest phase conserves/stores energy during switching transitions between multiple gain phases. The stored energy in the rest phase can be subsequently reused in the gain phase which is employed to generate the relatively regulated output voltage.

In one embodiment, a control circuit is arranged to control the switching (transitions) between the multiple gain phases and common rest phase by enabling and/or disabling the conduction of a plurality of switches, such as FET switches and the like, that are coupled to the plurality of capacitors. The control circuit may be arranged to determine when to cause a transition from one selected gain and the next larger or smaller gain based on one or more factors, including, but not limited to, input voltage, output voltage, output impedance of a gain phase, load, energy efficiencies, design margins, and the like. The control circuit may include one or more processors, controllers, digital components, analog components, and the like. Additionally, the plurality of FET based switches can be heterogeneous or homogeneous arrangements of PMOS and NMOS switches.

Also, at least one embodiment of the invention generally provides for selecting larger gains before the output voltage falls below a predetermined ratio (desired output voltage)/(fractional gain). The trigger for switching to another gain can be selected based on one or more factors, including, but not limited to input voltage, output voltage, output impedance of a gain phase, load, and the like. Moreover, the plurality of capacitors can be arranged to generate substantially less electromagnetic interference during buck voltage regulation for fractional gains than might be expected to be generated by one or more inductive components.

Figure 12:
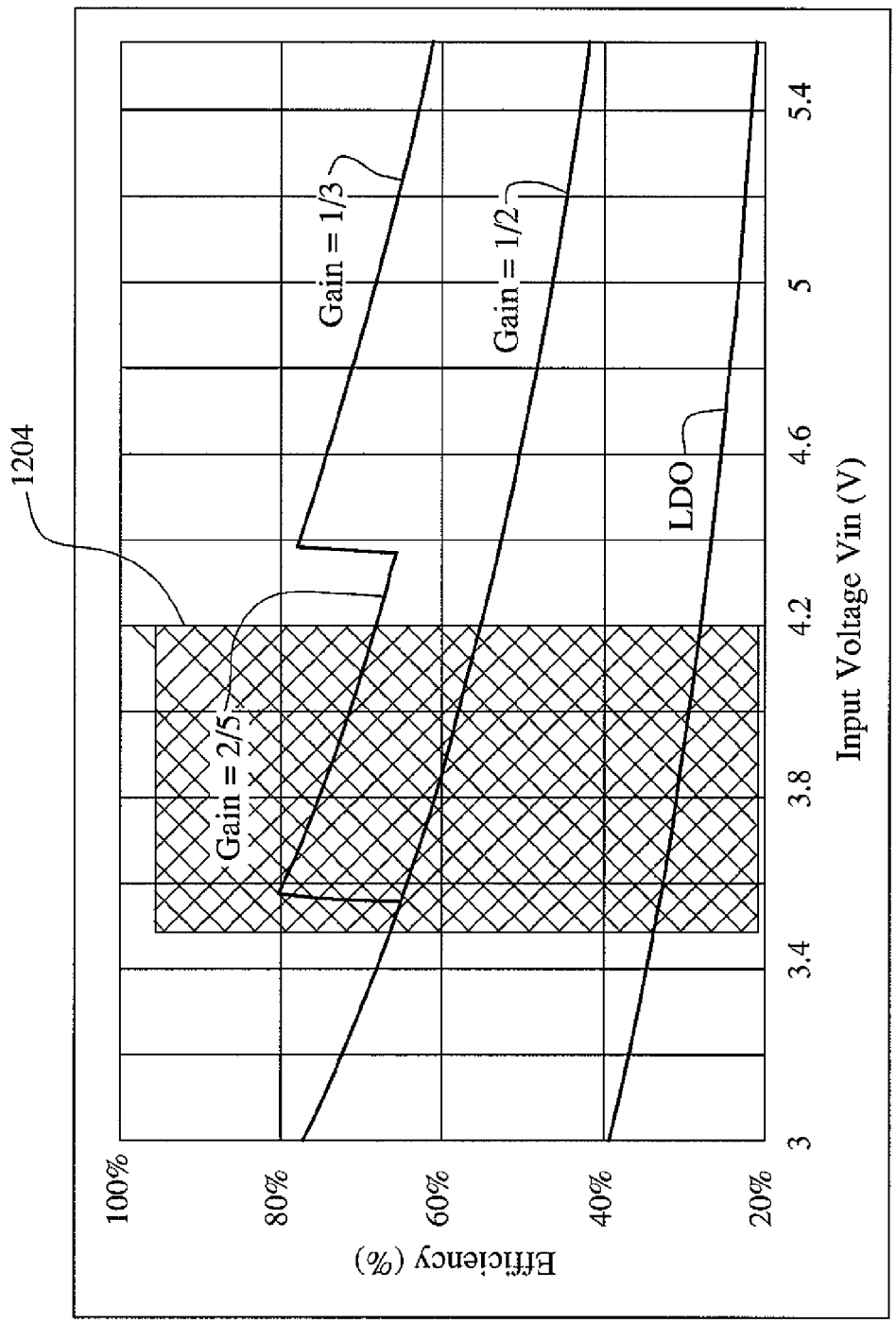
FIG. 12 compares performance of an exemplary voltage regulator compared against performance of a Low Drop-Out voltage regulator.

FIG. 12 shows the exemplary performance of an inventive switched capacitor buck regulator consistent with exemplary embodiments described herein, compared with exemplary performance of a Low Drop-Out (LDO) voltage buck regulator. As shown, the invention provides a 1.2 V output voltage that is based on the terminal voltage of a lithium ion battery which ranges from 4.2 V at full charge to 3.0 V or less at full or partial discharge.

As discussed, the voltage at a battery's terminal changes over a range as the battery discharges. This range of terminal/input voltages can be divided into sub-ranges or regions, and the invention is configurable to provide different gain phases for each sub-range. As illustrated in FIG. 12, the invention provides a fractional gain of ⅓ for the sub-range from 5.5 V to about 4.35 V for the terminal (input) voltage from a battery. Similarly, a gain of ⅖ is provided for the sub-range from about 4.35 V to about 3.47 V, and a gain of ½ is provided for the sub-range from about 3.53 V to about 3.0 volts. Additionally, FIG. 12 shows region 1204 spanning input voltages ranging from 4.2 V to about 3.47 V, which represents the terminal voltage for a typical Lithium Ion battery for a substantial amount of the time that the battery is discharging. Although fractional gain phases of ⅓, ⅖, and ½ are discussed here, other fractions gains may be provided by the invention for sub-ranges of the input voltage, including, but not limited to, ⅛, ¼, ¾, and the like. Additionally, under some conditions, the invention may provide a unity (one) gain in addition to or instead of a fractional gain.

FIG. 1A illustrates an exemplary switch array circuit in accordance with a first embodiment, capable of providing multiple gains less than or equal to unity. The circuit shown in FIG. 1A is configurable with the plurality of MOSFET switches (S1-S11) into one of a common rest phase and a gain phase. The gain phase can have different fractional gains provided by the selective arrangement/connection of a plurality of capacitors (C1, C2, C3, and Ch). As shown, the exemplary circuit can provide different fractional gains of one-half, one-third, and two-fifths when the plurality of capacitors are selectively connected in a gain phase. Although not shown, a separate voltage regulation loop could be included. For example, the output voltage signal could be regulated at a particular level by a regulation loop that employs at least one of Pulse Frequency Modulation (PFM), Pulse Width Modulation (PWM), Charge Transfer Modulation (CTM), and the like.

FIG. 1A illustrates circuit 102 which includes input voltage terminal Vin, output voltage terminal Vout, four capacitors C1, C2, C3 and Ch, ground, and eleven switches S1-S11. Although polarized capacitors are shown, the capacitors can be any kind of capacitor (including for example electrolytic, ceramic, tantalum, plastic, silver mica, and other types). The switches can be any kind of switched device, for example Metal-Oxide Semiconductor Field Effect Transistors (MOSFETs), analog switches, bipolar junction transistors, and the like. Terminals C1P-C3P and C1M-C3M on each side of capacitors C1-C3 are also shown, and can represent external connections or pads of an integrated circuit (IC) which has one or more of switches S1-S11 included with the IC. These external connections or pads, can also include input and output voltage terminals Vin and Vout. Furthermore, circuit 102 may be arranged in switching multiple gain and common rest phases as discussed in greater detail with regard to FIGS. 2-5.

As shown in FIG. 1A, the terminals C1P and C1M are respectively coupled to the anode and cathode ends of capacitor C1, terminals C2P and C2M are respectively coupled to the anode and cathode ends of capacitor C2, and terminals C3P and C3M are respectively coupled to the anode and cathode ends of capacitor C3. Also, switch S1 is coupled between input voltage terminal Vin and terminal C1P of capacitor C1. Somewhat similarly, switch S2 is coupled between terminal C1P of capacitor C1 and output voltage terminal Vout. Switch S4 is coupled between terminal C1M of capacitor C1 and output voltage terminal Vout, and switch S5 is coupled between terminal C1M of capacitor C1 and ground. Switch S3 is coupled between terminal C1M of capacitor C1 and terminal C2P of capacitor C2. Switch S6 is coupled between terminal C2P of capacitor C2 and output voltage terminal Vout. Switch S9 is coupled between terminal C2M of capacitor C2 and output voltage terminal Vout. Switch S8 is coupled between terminal C2M of capacitor C2 and terminal C3P of capacitor C3. Switch S7 is coupled between terminal C2P of capacitor C2 and terminal C3P of capacitor C3. Switch S10 is coupled between terminal C3M of capacitor C3 and ground. Switch S11 is coupled between output voltage terminal Vout and terminal C3M of capacitor C3. Also, capacitor Ch is coupled between output voltage terminal Vout and ground. Capacitor Ch is arranged to store electrical charge for reuse after switching transitions between multiple gain phases to a common rest phase.

Figure 1B:
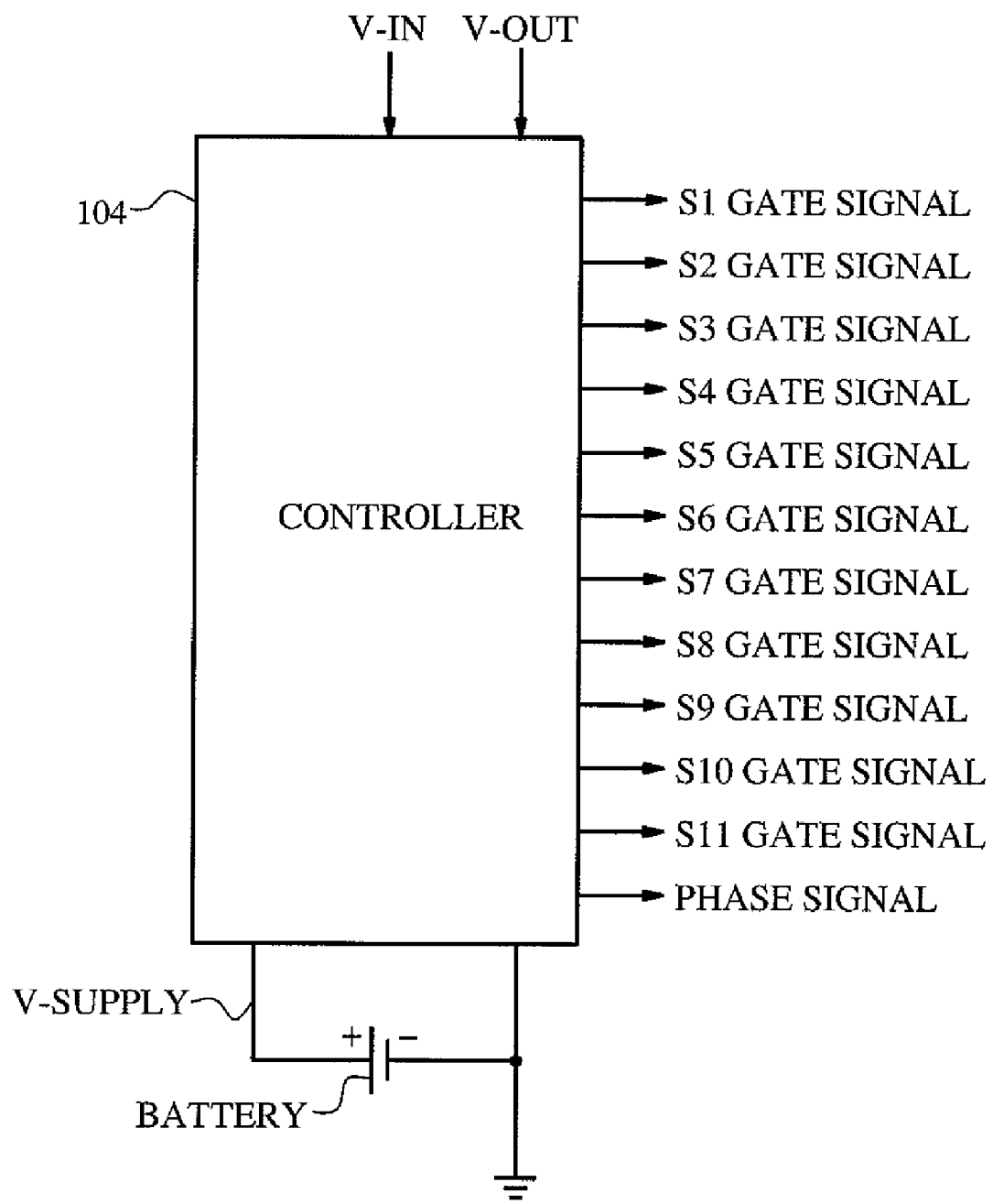
FIG. 1B illustrates an exemplary controller that can be used with the switching circuit of FIG. 1A.

FIG. 1B illustrates exemplary controller 104 that can control the conduction of the switches and thereby a selected gain provided by the switched arrangement of the capacitors shown in FIG. 1A. Further, as shown in FIGS. 2-5, the control of the conduction of the switches enables different gains to be provided by different arrangements of the capacitors in a gain phase and a common rest phase. Controller 104 can also be employed to control the selected arrangement of the switches and capacitors illustrated in the circuit of FIG. 6, and for the embodiments illustrated and discussed below for gain and rest phases in FIGS. 7-10.

Controller 104 can include one or more regulation loops to modulate the operation of the circuits shown in FIGS. 1A, and 2-10 and/or otherwise regulate the output voltage with one or more techniques, including but not limited to, Pulse Frequency Modulation (PFM) Pulse Width Modulation (PWM), Charge Transfer Modulation (CTM), and the like.

As shown in FIG. 1B, controller 104 can output control signals "S1 GATE SIGNAL", "S2 GATE SIGNAL", . . . "S11 GATE SIGNAL" respectively to control the conduction of switches S1, S3, . . . S11, and thereby the gain provided by a selective arrangement of the capacitors coupled between the switches. Controller 104 can also output control signal "PHASE SIGNAL", which can for example by used to control a regulation loop that can be incorporated within, or external to the controller.

As illustrated, controller 104 is arranged to receive an input voltage at terminal V-IN, which can be similarly provided to terminal VIN for the exemplary circuits shown in FIGS. 1A, and 2-10. In one embodiment, controller 104 can be arranged to modulate the conduction of the input voltage signal through switch S1 in the exemplary circuit(s). Also, controller 104 can be arranged to receive power at terminal V-SUPPLY from a power source such as a battery that is separate from the power source that provides the input voltage to the exemplary circuits. However, the same power source that provides power at terminal V-SUPPLY can be employed to provide the input voltage to the exemplary circuits.

An output voltage signal from any of the exemplary circuits controlled by controller 104 is provided at terminal V-OUT. Controller 104 can also receive reference voltages (not shown) or values, and/or store reference voltage values within the controller 104, which can be used to regulate or otherwise control the exemplary circuits to provide one or more desired output voltages. Controller 104 can thus monitor various input and output voltages, and operate the switches and enable, operate, implement, or assist a regulation loop or other regulation mechanism and appropriately switch the circuits of FIG. 1A and FIG. 6 among the gain and rest phases and operational modes shown in FIGS. 2-5, 7-10 and/or described herein, to output one or more predetermined output voltages. Controller 104 can be implemented in any of a variety of ways, for example using one or more of an ASIC (Application Specific Integrated Circuit), programmable logic device, digital circuitry, analog circuitry, hardware in conjunction with software, processor, microcontroller, any combination thereof, and so forth.

Figure 2:
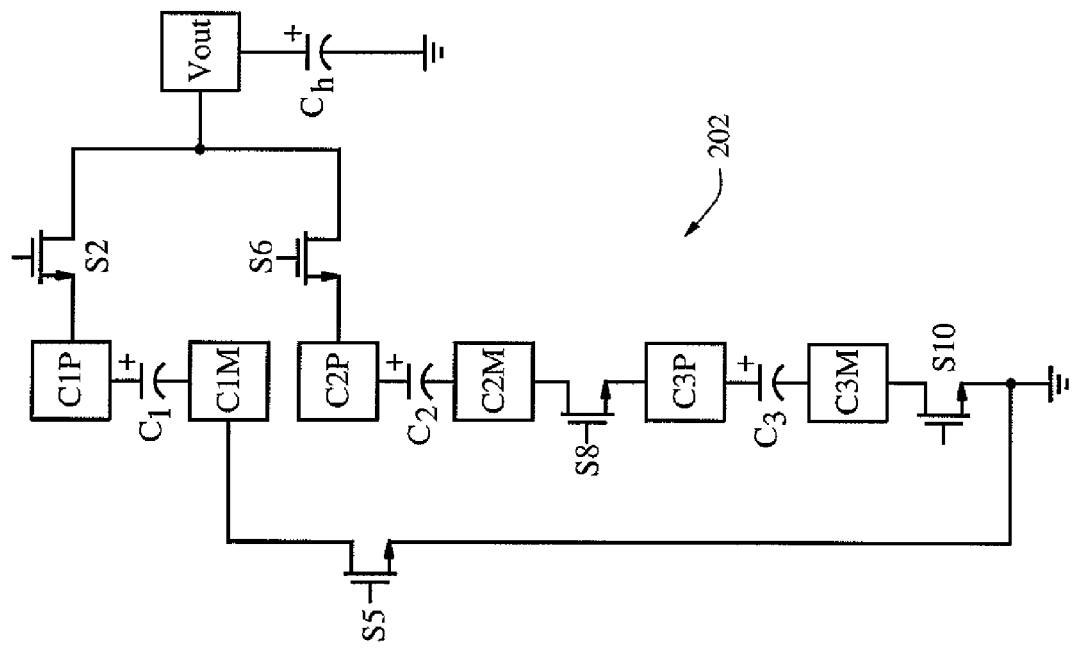
FIG. 2 illustrates an exemplary common rest phase of the circuit of FIG. 1A.

FIG. 2 illustrates an exemplary common rest phase 202 of the switch array circuit shown in FIG. 1A. For rest phase 202, switches S2, S5, S6, S8 and S10 are closed (conducting) and remaining switches S1, S3-S4, S7, S9 and S11 are open (not conducting). Since the open switches are not actively employed in the common rest phase, they are not shown for clarity. The conduction of switches S2, S5, S6, S8, and S10 enable capacitors C2 and C3 to be coupled in series between the output voltage terminal Vout and ground, and capacitors C1 and Ch to be coupled in parallel between output voltage terminal Vout and ground (and in parallel with the series connection of the capacitors C2, C3). When this rest phase is switched with the gain phases of FIGS. 3-5, it can smooth the output voltage at terminal Vout with an overall gain of one third (⅓), two fifths (⅖) or one half (½) of the input voltage provided at terminal Vin.

Figure 3:
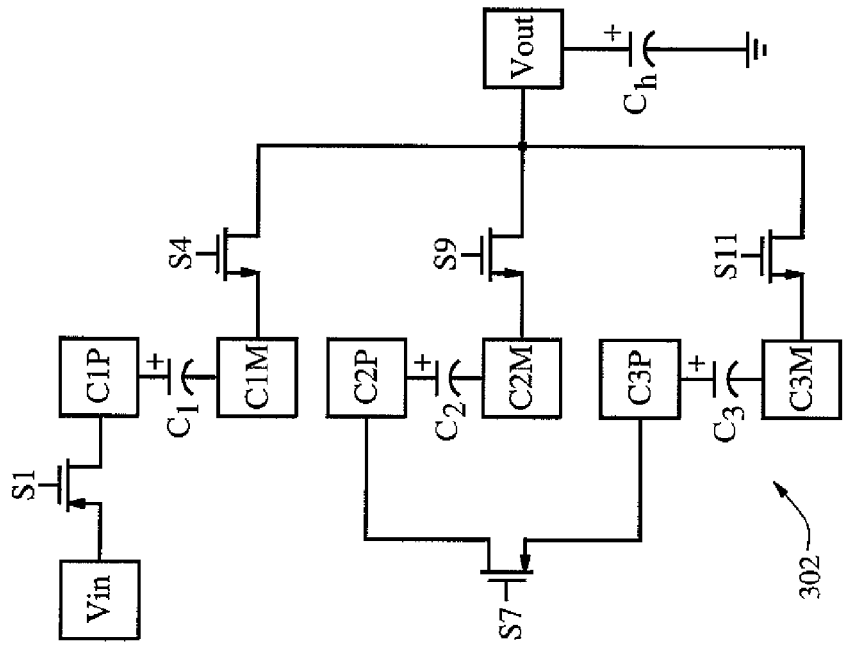
FIG. 3 illustrates an exemplary gain phase of one-half gain for the circuit of FIG. 1A.

FIG. 3 illustrates an exemplary gain phase 302 for a gain of one-half, where switches S1, S4, S7, S9, and S11 are closed/conducting and remaining switches S2-S3, S5-S6, and S8-S10 are open/non-conducting (left out of drawing for clarity). Gain phase 301 causes capacitor C1 to be coupled in series between input voltage terminal Vin and output voltage terminal Vout. Also, capacitor Ch is coupled in series between output voltage terminal Vout and ground, and capacitors C2, C3 are "equalized" whereby their anode terminals C2P, C3P are connected together by the conduction of switch S7 and their cathode terminals are respectively connected by switches S9 and S11 to output voltage terminal Vout. In an exemplary embodiment, capacitors C2 and C3 can alternatively be connected (or disconnected) to float in gain phase 302. When this gain phase is switched with the common rest phase of FIG. 3, it can cause a relatively smooth output voltage at terminal Vout with an overall gain of one half (½) of the input voltage provided at terminal Vin.

Figure 4:
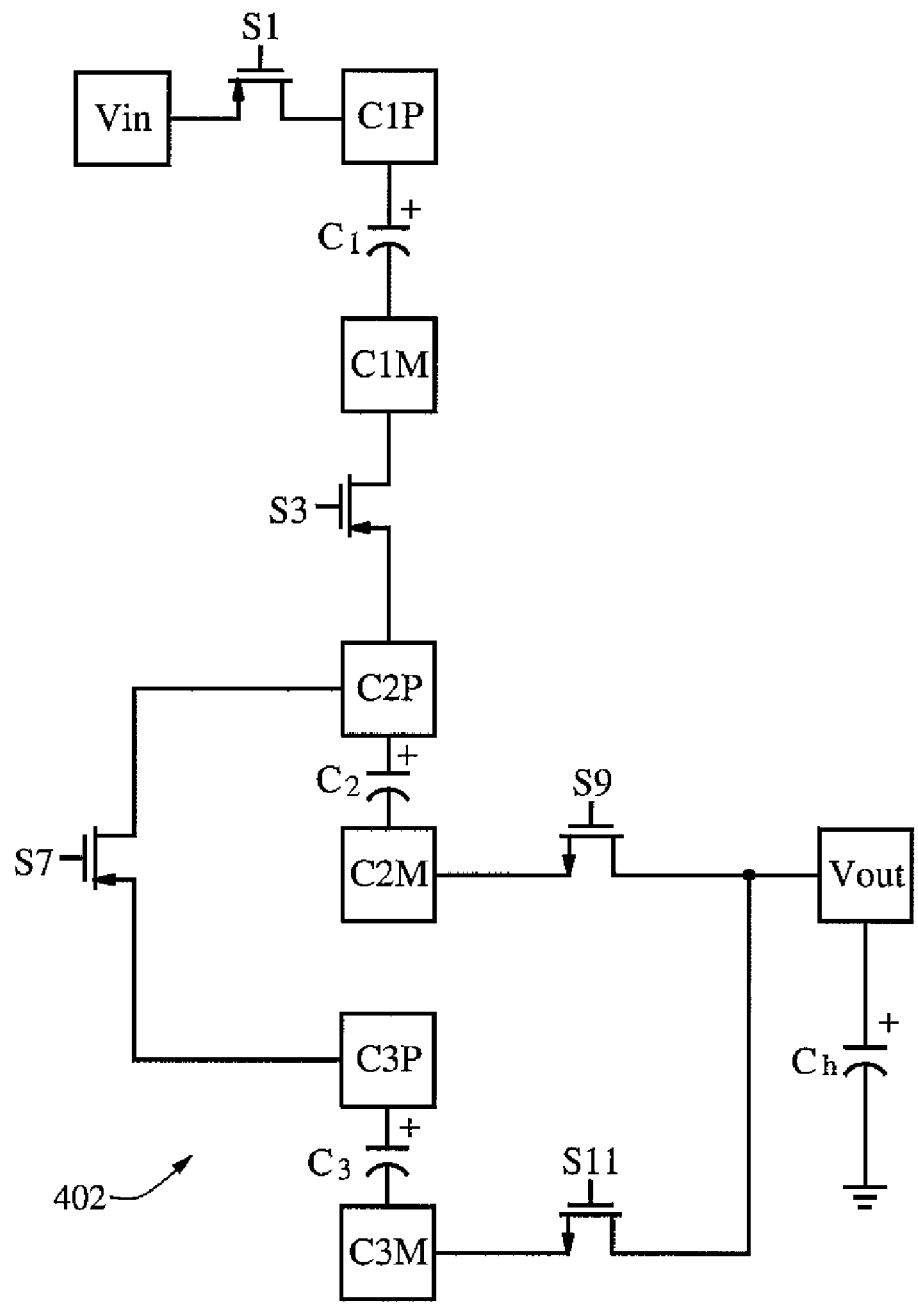
FIG. 4 illustrates an exemplary gain phase of two-fifths gain for the circuit of FIG. 1A.

FIG. 4 shows gain phase 402 of the switch array circuit shown in FIG. 1A, that can be used to provide an output voltage that is two-fifths of an input voltage. As illustrated in FIG. 4, switches S1, S3, S7, S9 and S11 are closed/conducting, and remaining switches S2, S4-S6, S8 and S10 are open/non-conducting (left out of drawing for clarity). For gain phase 402, capacitors C2 and C3 are connected in parallel between capacitor C1 and output voltage terminal Vout, and capacitor C1 is connected in series between input voltage terminal Vin and the parallel connection of capacitor C2 and C3. When this gain phase is switched with the common rest phase of FIG. 3, it can cause a relatively smooth output voltage at terminal Vout with an overall gain of two-fifths (⅖) of the input voltage provided at terminal Vin.

Figure 5:
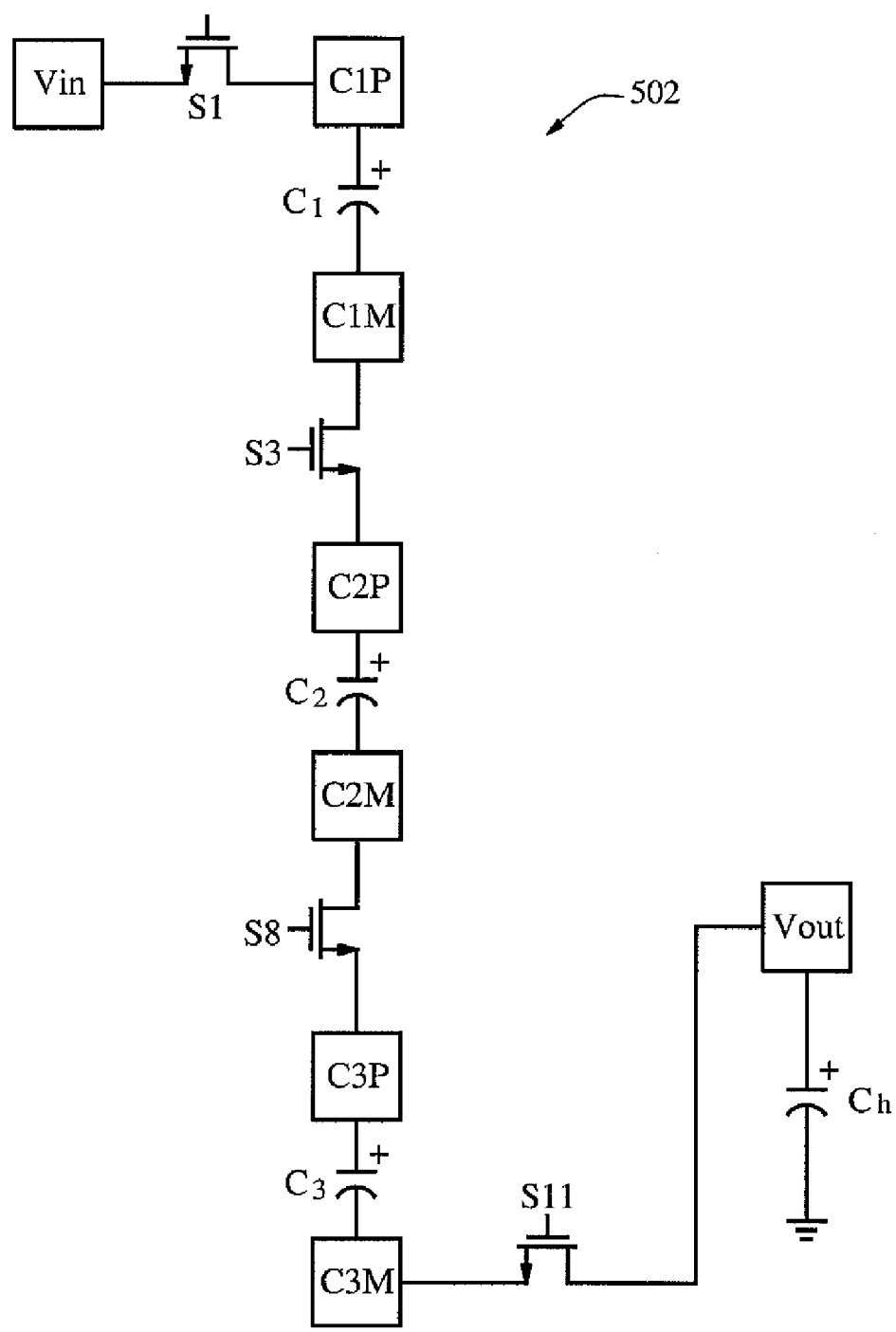
FIG. 5 illustrates an exemplary gain phase of one-third gain for the circuit of FIG. 1A.

FIG. 5 shows gain phase 502 of the switch array circuit of FIG. 1A, that can provide an output voltage that is one-third of an input voltage. As shown in FIG. 5, switches S1, S3, S8 and S11 are closed/conducting, and remaining switches S2, S4-S7, and S9-S10 are open/non-conducting. For gain phase 502, capacitors C1, C2, and C3 are placed in series between input voltage terminal Vin and output voltage terminal Vout. Capacitor Ch is coupled between output voltage terminal Vout and ground. When this gain phase is switched with the common rest phase of FIG. 3, it can cause a relatively smooth output voltage at terminal Vout with an overall gain of one third (⅓) of the input voltage provided at terminal Vin.

Figure 6:
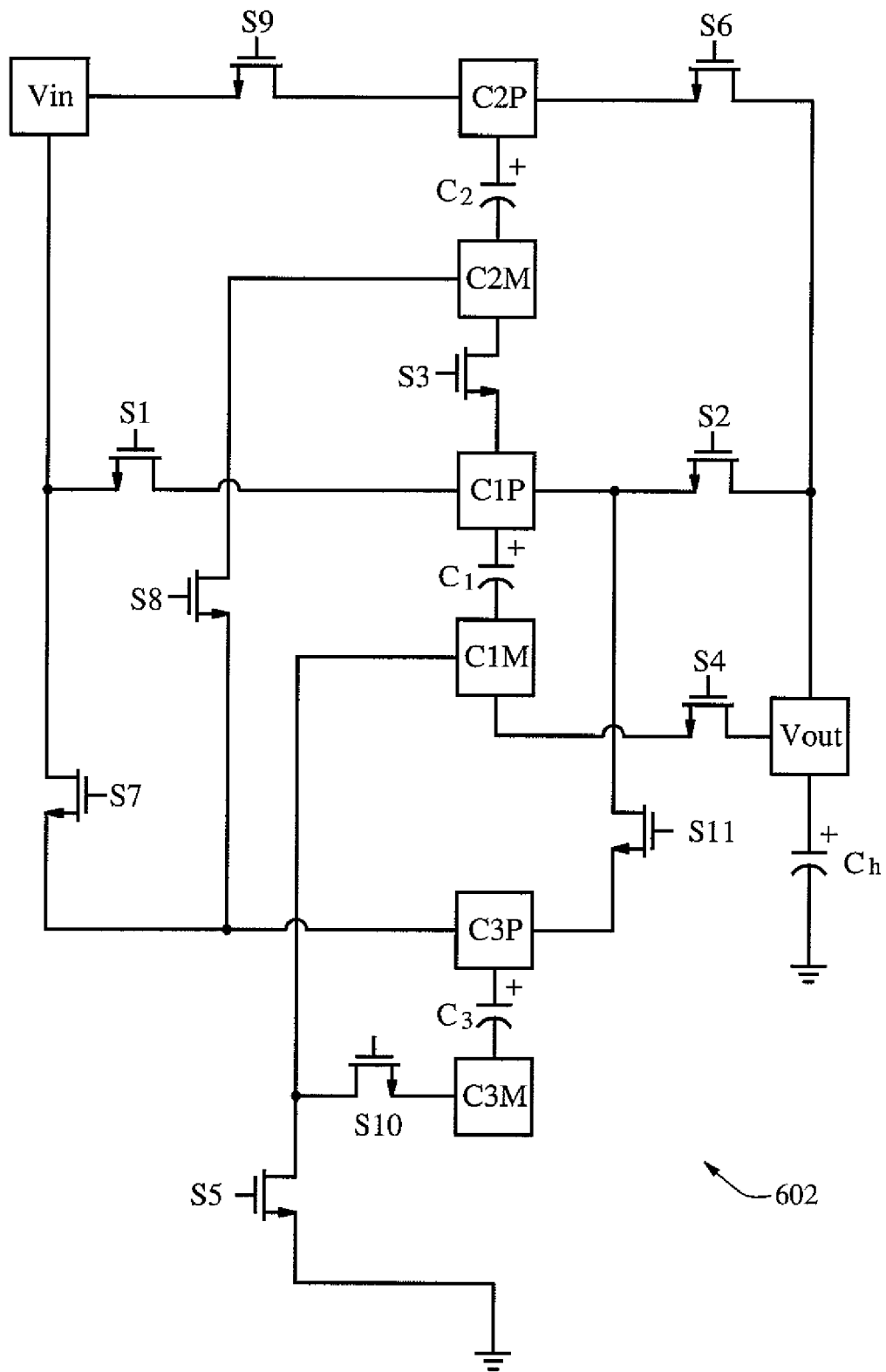
FIG. 6 illustrates an exemplary circuit in accordance with a second embodiment.

FIG. 6 illustrates an exemplary switch array circuit in accordance with a second embodiment of the invention that achieves gains somewhat similar to those attained for the circuit illustrated in FIG. 1A, albeit differently. The circuit shown in FIG. 6 can be configured via switches S1 . . . S11, into any one of a common rest phase and a plurality of gain phases having different overall gains, to result for example in overall gains of one-half, two-fifths, and one-third. Although a regulation loop is not shown, they can be applied to, or used, with the circuit of FIG. 6, in a manner somewhat similar to the discussion of such loops in regard to the circuit disclosed in FIG. 1A.

FIG. 6 shows circuit 602 including input voltage terminal Vin, output voltage terminal Vout, four capacitors C1, C2, C3 and Ch, ground, and eleven switches S1-S11. Although FIG. 6 shows polarized capacitors in circuit 602, these capacitors can be any kind of capacitor (including for example electrolytic, ceramic, tantalum, plastic, silver mica, and other types). Similarly, the switches can be any kind of switch, for example MOSFETs, bipolar junction transistors, and analog switches. Terminals C1P-C3P and C1M-C3M on each side of capacitors C1-C3 are also shown, and can represent external connections or pads of an integrated circuit (IC) which has one or more of switches S1-S11 on the IC. Such connections or pads, which can also include the input and output voltage terminals Vin and Vout, can be used to electrically couple capacitors or other elements that are external to the IC, to the switches of the IC. As shown in FIG. 6, terminals C1P and C1M are respectively located on anode and cathode ends of capacitor C1, terminals C2P and C2M are respectively located on anode and cathode ends of capacitor C2, and terminals C3P and C3M are respectively located on anode and cathode ends of capacitor C3. Also, capacitor Ch is arranged to store electrical charge for reuse after switching transitions between different gain phases and a common rest phase. Additionally, capacitor Ch is further arranged to store electrical charge for reuse after switching transitions between a common rest phase and different gain phases.

As shown in FIG. 6, switch S9 is coupled between input voltage terminal Vin and terminal C2P of capacitor C2, and switch S6 is coupled between terminal C2P of capacitor C2 and output voltage terminal Vout. Switch S1 is coupled between terminal C1P of capacitor C1 and input voltage terminal Vin, switch S3 is coupled between terminal C1P of capacitor C1 and terminal C2M of capacitor C2, and switch S2 is coupled between terminal C1P of capacitor C1 and output voltage terminal Vout. Switch S4 is coupled between terminal C1M of capacitor C1 and output voltage terminal Vout. Switch S11 is coupled between terminal C1P of capacitor C1 and terminal C3M of capacitor C3. Switch S8 is coupled between terminal C2M of capacitor C2 and terminal C3P of capacitor C3. Switch S7 is coupled between input voltage terminal Vin and terminal C3P of capacitor C3. Switch S5 is coupled between terminal C1M of capacitor C1 and ground, and switch S10 is coupled between terminal C3M of capacitor C3 and terminal C1M. Also, capacitor Ch is coupled between output voltage terminal Vout and ground. Furthermore, circuit 602 may be arranged in gain and rest phases as discussed in greater detail with regard to FIGS. 7-10.

Figure 7:
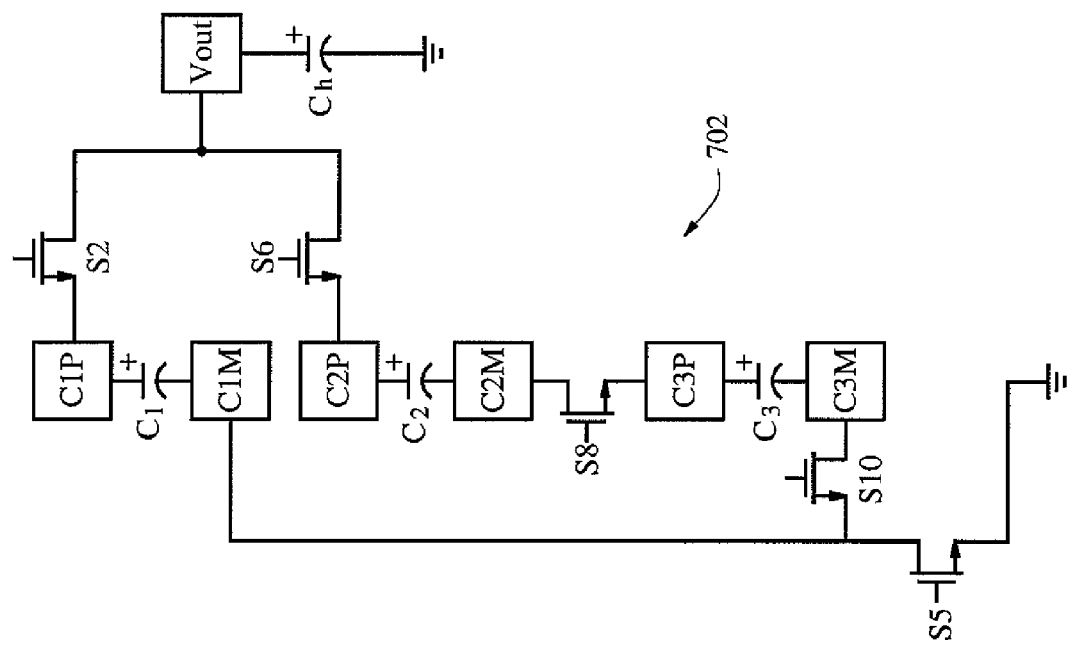
FIG. 7 illustrates an exemplary common rest phase of the circuit of FIG. 6.

FIG. 7 illustrates an exemplary common rest phase 702 of the switch array circuit shown in FIG. 6. Switches S2, S5, S6, S8 and S10 are closed/conducting and the remaining switches S1, S3-S4, S7, S9 and S11 are open/non-conducting (not shown for clarity), which results in capacitors C2 and C3 being connected in series between output voltage terminal Vout and ground, and capacitors C1 and Ch being connected in parallel between output voltage terminal Vout and electrical ground (and in parallel with the series connection of capacitors C2 and C3). Rest phase 702 is commonly employed during a transition between phases for each of the gain phases shown in FIGS. 8-10.

Figure 8:
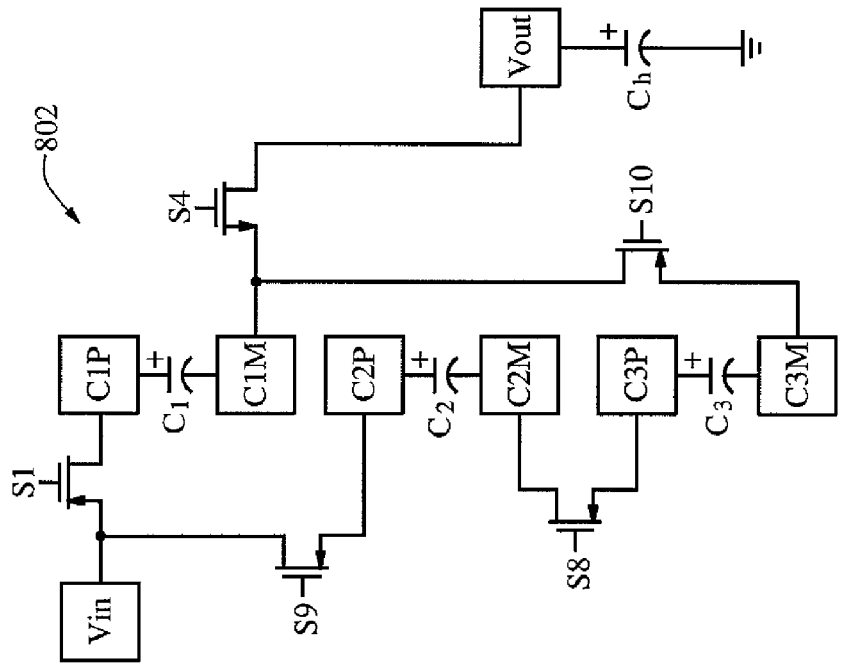
FIG. 8 illustrates an exemplary gain phase of one-half gain for the circuit of FIG. 6.

FIG. 8 illustrates exemplary gain phase 802 of the switch array circuit of FIG. 6, which is arranged to provide an overall gain of one-half for an input voltage provided at terminal Vin. Switches S1, S4, S8, S9 and S10 are closed/conducting and remaining switches S2-S3, S5-S7, and S11 are open/non-conducting (not shown for clarity). Capacitor C1 is coupled in series between input voltage terminal Vin and output voltage terminal Vout. Capacitor Ch is coupled in series between output voltage terminal Vout and ground, and capacitors C2 and C3 are coupled in series between input voltage terminal Vin and output voltage terminal Vout (and in parallel with capacitor C1). Furthermore, when gain phase 802 is switched with the rest phase of FIG. 7, it can cause a relatively smooth output voltage at terminal Vout with an overall gain of one half ($\frac{1}{2}$) of the input voltage provided at terminal Vin.

Figure 9:
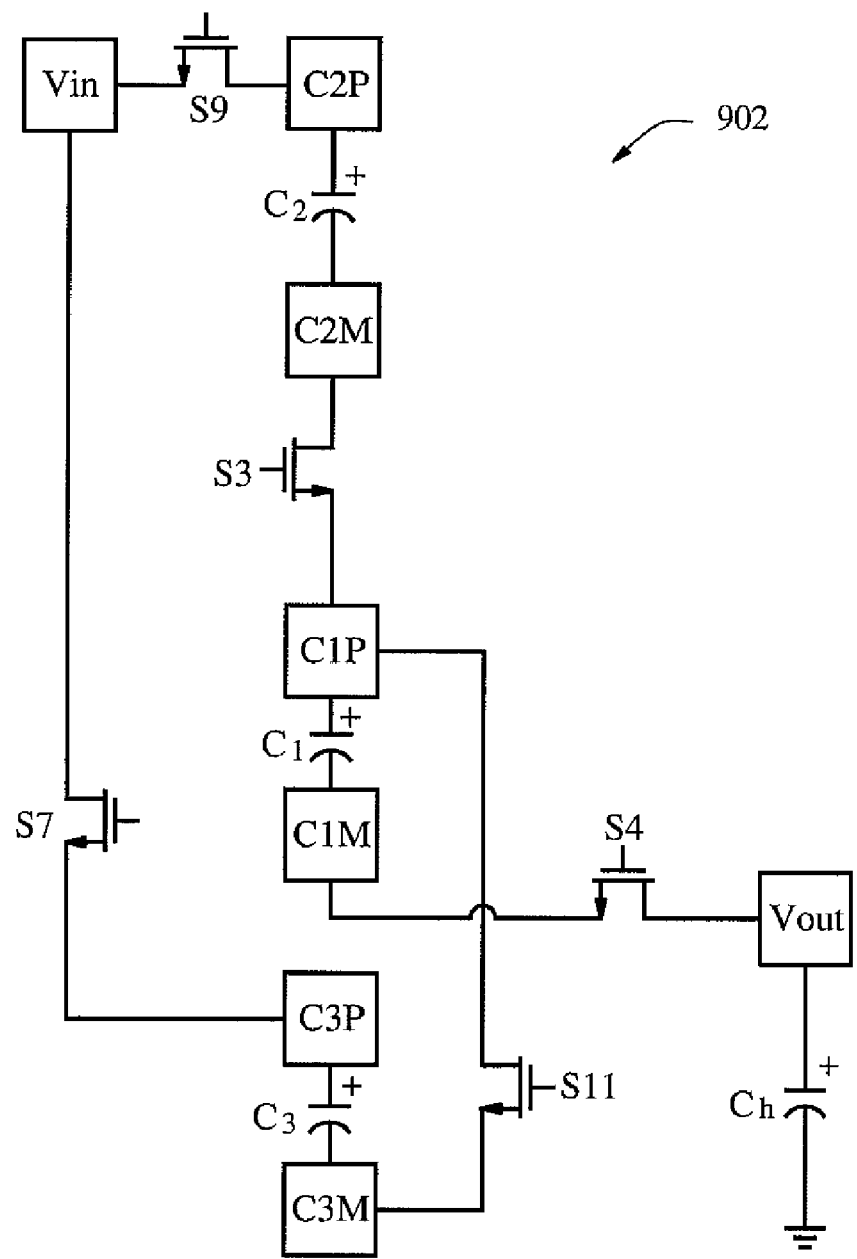
FIG. 9 illustrates an exemplary gain phase of two-fifths gain for the circuit of FIG. 6.

FIG. 9 shows exemplary gain phase 902 of the switch array circuit of FIG. 6, which is arranged to provide the gain phase for a gain of $\frac{2}{5}$ for an input voltage provided at terminal Vin. Switches S3, S4, S7, S9 and S11 are closed/conducting, and remaining switches S1-S2, S5-S6, S8 and S10 are open/non-conducting (not shown for clarity). Capacitors C2 and C3 are coupled in parallel between capacitor C1 and input voltage terminal Vin. Capacitor C1 is coupled in series between output voltage terminal Vout and capacitors C2 and C3. Furthermore, when gain phase 902 is switched with the rest phase of FIG. 7, it can cause a relatively smooth output voltage at terminal Vout with an overall gain of two fifths ($\frac{2}{5}$) of the input voltage provided at terminal Vin.

Figure 10:
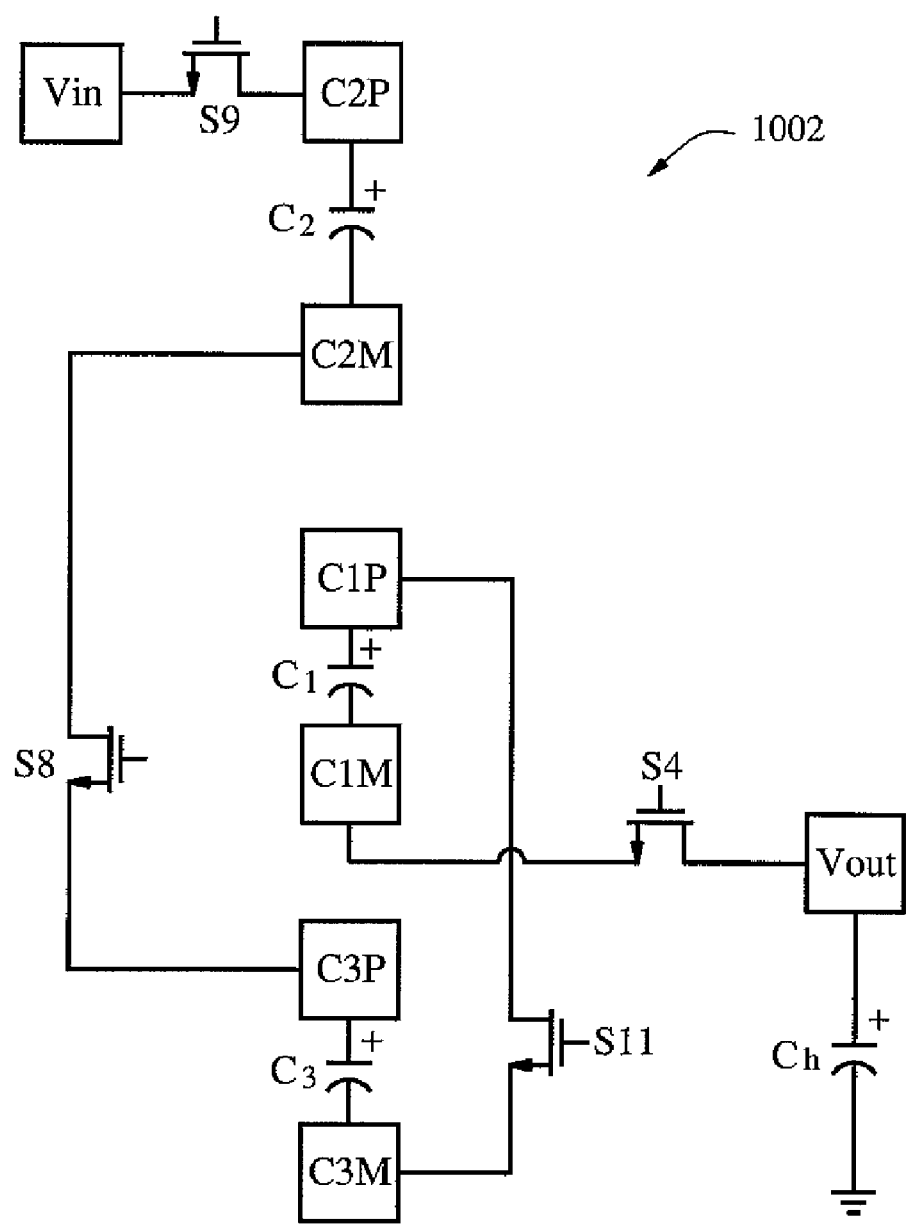
FIG. 10 illustrates an exemplary gain phase of one-third gain for the circuit of FIG. 6.

FIG. 10 shows gain phase 1002 of the switch array circuit of FIG. 6, which is arranged to provide an overall gain of $\frac{1}{3}$ of an input voltage provided at terminal Vin. Switches S4, S8, S9 and S11 are closed/conducting, and remaining switches S1-S3, S5-S7, and S10 are open/non-conducting. Capacitors C1, C2, and C3 are coupled in series between input voltage terminal Vin and output voltage terminal Vout. Capacitor Ch is coupled between output voltage terminal Vout and ground. Furthermore, when gain phase 1002 is switched with the rest phase of FIG. 7, it can cause a relatively smooth output voltage at terminal Vout with an overall gain of one third ($\frac{1}{3}$) of the input voltage provided at terminal Vin.

Figure 11:
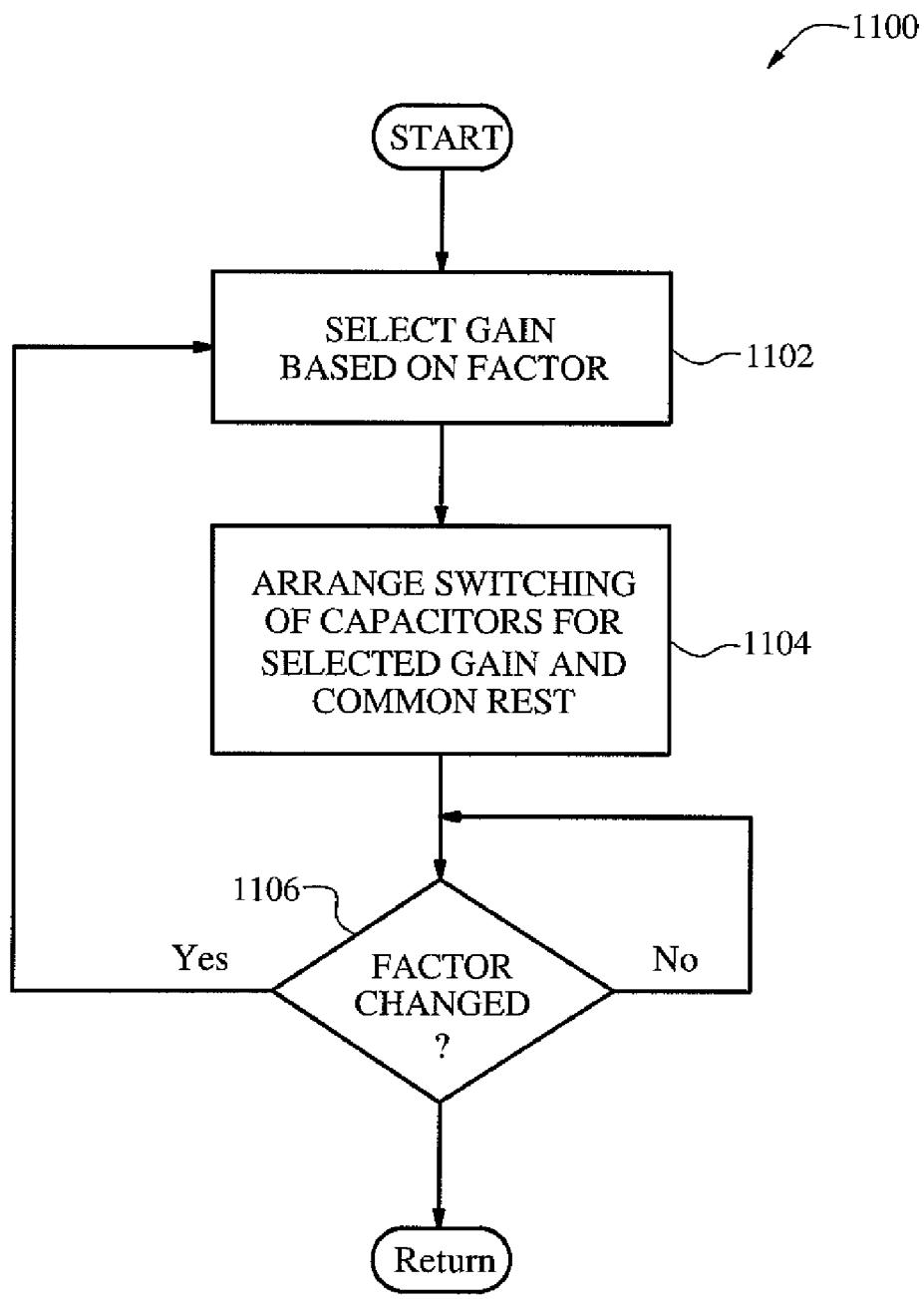
FIG. 11 illustrates a method for operating a multiple-gain switched capacitor circuit, consistent with an exemplary embodiment.

FIG. 11 illustrates an overview of process 1100 for buck regulating an output voltage based on switched capacitor gains that are less than or equal to unity. Moving from a start block, the process steps to block 1102 where a gain for an input voltage is selected based on at least one factor. Typically, the initial gain is fractional, e.g., a fractional gain of $\frac{1}{4}$, $\frac{1}{3}$, $\frac{2}{5}$, or $\frac{1}{2}$. However, the selected gain may also be relatively equivalent to unity (one).

The process transitions to block 1104 where a plurality of capacitors are arranged for switching between the selected gain phase and a common rest phase. The switching of the gain phase to the rest phase and back to the gain phase enables a relatively smooth output voltage. Also, energy stored in the capacitors during the selected gain phase is stored in the rest phase for subsequent reuse when the circuit switches back to the selected gain phase.

The process advances to decision block 1106 where a determination is made as to whether or not the factor has changed. If not, the process loops at decision block 1106 until the determination is true. Once the determining factor has changed, the process loops back to block 1102 and performs substantially the same actions as discussed above. Additionally, if is determined at decision block 1106 that the input voltage is lower than a predetermined level, the process stops generating the output voltage and returns to performing other actions.

Additionally, in one embodiment, all of the switches S1-S11 of FIGS. 1A and 6 can be opened/non-conducting during the switching between phases for the plurality of capacitors, or are otherwise actuated so that there is relatively no overlap between phases. The frequency at which the switch array circuit is switched among phases can be any frequency. As the switching frequency increases, the impedance of the switch array circuit will generally decrease based in part on the arrangement of a plurality of capacitors in the circuit.

In one embodiment, the switch array circuit can be switched in such a way that it spends relatively equivalent periods of time in the common rest phase and a selected gain phase. However, in other embodiments, a ratio of the period of time spent in the common rest phase to the period of time spent in a selected gain phase can be less than or greater than one, and can for example depend on one or more of: the particular gain of the gain phase; the output load placed on the output voltage terminal of the regulator incorporating the circuit; a quality or characteristic of the output voltage at the output voltage terminal (e.g. ripple); and other factors. For example, the switching frequency and/or the duty cycle or common/gain time ratio can be adjusted to increase or maximize quality of the output power signal provided at the output voltage terminal of the circuit.

In one embodiment, the switch array circuit is switched between the common rest phase and one of the gain phases, and is not directly switched from one of the gain phases to another of the gain phases. Switching between the common rest phase and one of the gain phases can provide smooth gain transitions and thus improve the performance of a voltage regulator incorporating the switch array circuit, and eliminate or reduce undesirable characteristics or artifacts of the output power signal such as noise, ripple, and so forth.

Exemplary embodiments can employ circuits other than those shown in FIGS. 1A and 6, having for example a greater or fewer number of switches, and having phases that are equivalent or functionally equivalent to all or a subset of the phases shown in FIGS. 2-5 and 7-10. For example, exemplary embodiments can employ circuits having phases that are Thevenin equivalents of the common rest phases of FIGS. 2 and 7 and one or more of the gain phases of FIGS. 3-5 and FIGS. 8-10.

Figure 13A:
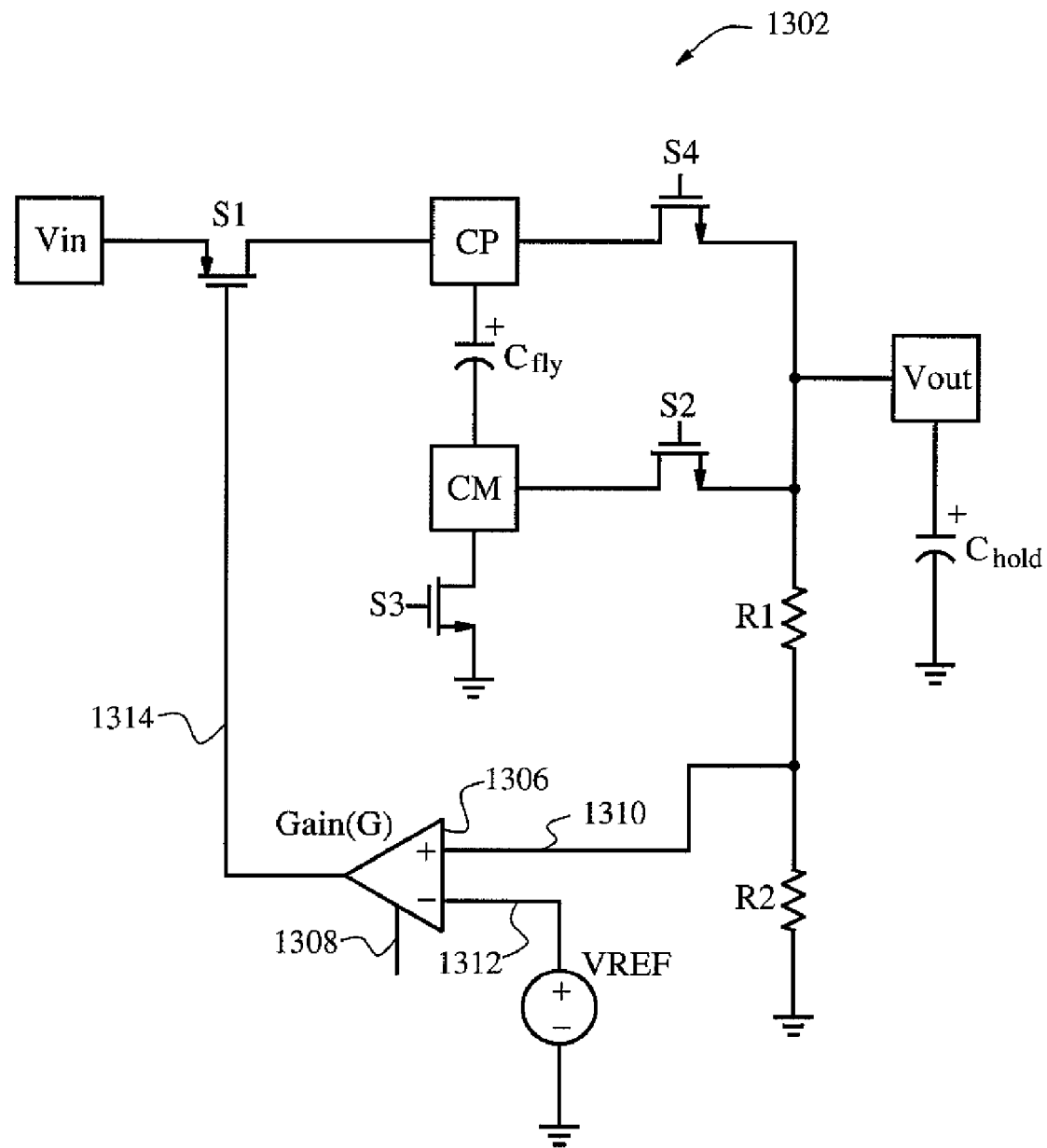
FIG. 13A illustrates an exemplary switching circuit in accordance with a third embodiment, including a regulation loop.

FIG. 13A illustrates an exemplary switch array circuit in accordance with a third embodiment, which is capable of providing a fractional or unity gain phase and a rest phase. The circuit shown in FIG. 13A can be configured to provide a gain of ½, and can also be configured to provide a unity gain that can be further regulated as a linear regulator circuit using for example, pulsed CTM, PWM, and PFM techniques.

FIG. 13A illustrates switch array circuit 1302 that includes input voltage terminal Vin, output voltage terminal Vout, switches S1, S2, S3, and S4, and two capacitors Cfly and Chold. Circuit 1302 also includes a regulation sub-circuit that includes switch S1 coupled between input voltage terminal Vin, capacitor Cfly (via terminal CP of capacitor Cfly) and switch S4, and an output terminal of operational amplifier 1306. Negative input terminal 1312 for operational amplifier 1306 is coupled to reference voltage source Vref, and positive input terminal 1310 is coupled to output voltage terminal Vout through resistor R1, and phase input terminal 1308 is arranged to switch operational amplifier 1306 on and off, and output terminal 1314 is coupled to a gate terminal of switch S1. The regulation sub-circuit also includes resistor R2 coupled between positive input terminal 1310 and ground.

As shown in FIG. 13A, switch S3 is coupled between ground and capacitor Cfly (via terminal CM of capacitor Cfly). Switch S4 is coupled between terminal CP of capacitor Cfly and output voltage terminal Vout, and switch S2 is coupled between terminal CM of capacitor Cfly and output voltage terminal Vout. Capacitor Chold is coupled between output voltage terminal Vout and ground. Also, capacitor Chold is arranged to store electrical charge for reuse after switching transitions between gain phases to a common rest phase.

Although FIG. 13A shows capacitors Cfly and Chold as polarized capacitors, these capacitors can be any type of capacitor (including for example electrolytic, ceramic, tantalum, plastic, silver mica, and other types). Also, switches S1-S4 can be any kind of switch, for example MOSFETs, bipolar junction transistors, analog switches, and the like. Terminals CP and CM are provided on the anode and cathode sides respectively of capacitor Cfly, and can represent external connections or pads of an integrated circuit (IC) which has one or more of the switches S1-S4 in the IC. External connections or pads, can also include the input and output voltage terminals Vin and Vout. Also, these external connections can be used to electrically connect capacitors (such as capacitor Cfly) or other elements that are external, to the internal switches of the IC.

Figure 14:
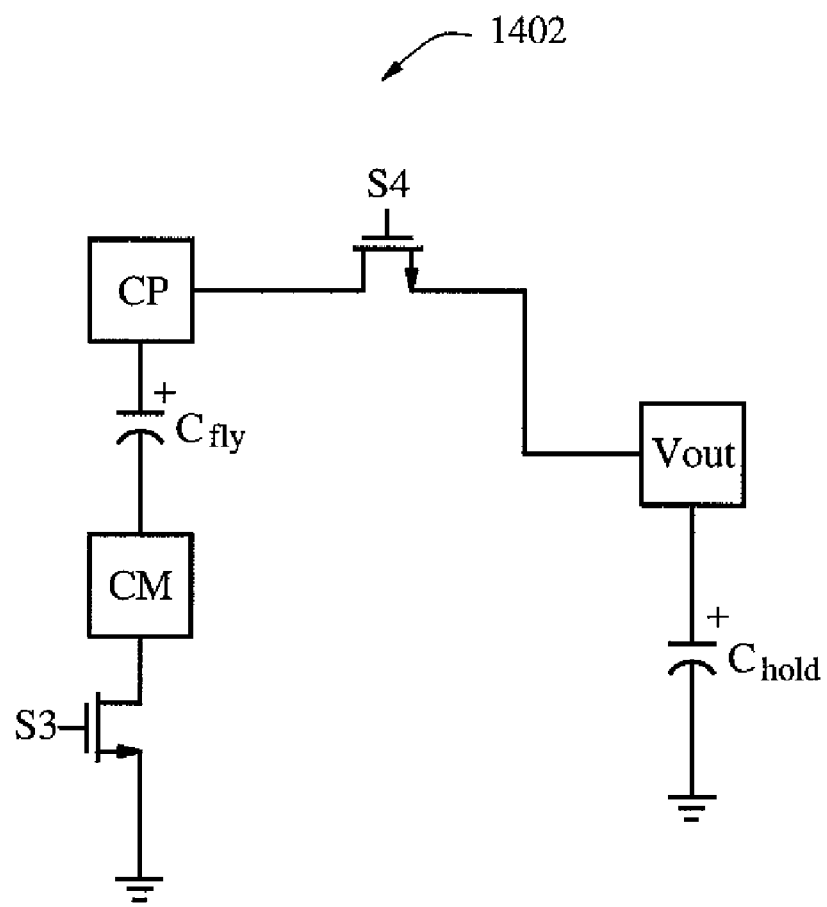
FIG. 14 illustrates an exemplary common rest phase of the circuit of FIG. 13A.

FIG. 14 illustrates exemplary rest phase 1402 of the circuit illustrated in FIG. 13A. Switches S3 and S4 are closed/conducting and the other remaining switches S1 and S2 (not shown for clarity) are open/non-conducting, which causes capacitors Cfly and Chold to be coupled in parallel between output voltage terminal Vout and ground. Rest phase 1402 is commonly employed during a transition between each of the gain phases shown in FIGS. 15 and 16.

Figure 15:
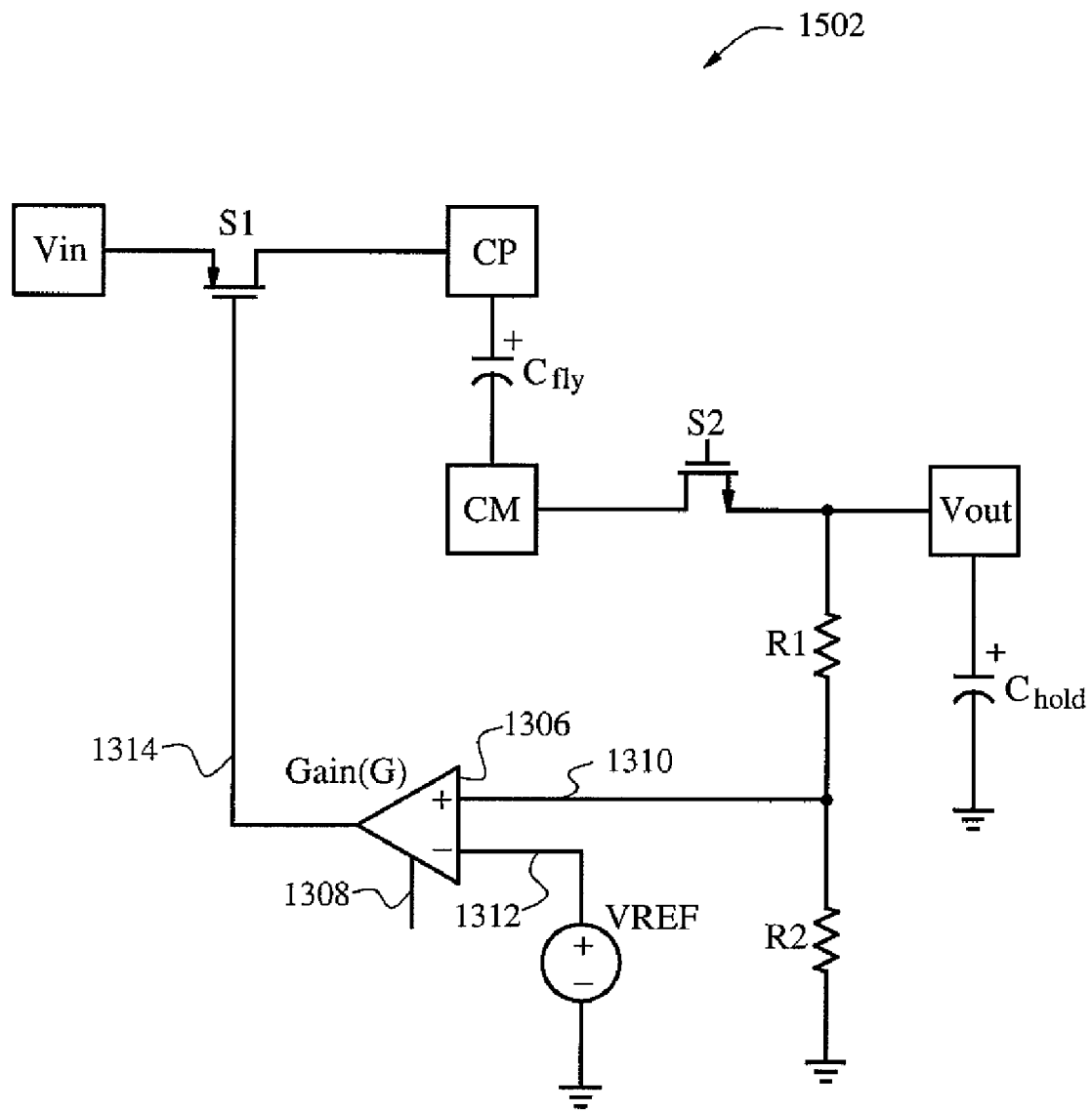
FIG. 15 illustrates an exemplary gain phase of one-half gain of the circuit of FIG. 13A.

FIG. 15 shows exemplary gain phase 1502 of the circuit of FIG. 13A, which provides an overall gain of ½. Switch S2 is closed and operational amplifier 1306 is enabled, and switches S3 and S4 are open/non-conducting (not shown for clarity). The arrangement of resistors R1 and R2, reference voltage source Vref, and operational amplifier 1306 enable control of the conduction of switch S1 based at least in part on a level of the output voltage at terminal Vout.

If the switch S1 is partially conducting, then there is a voltage drop across switch S1 and the voltage across capacitors Cfly and Chold occurs as some fraction of the input voltage (e.g. Vc=Vin−Vs1). Furthermore, when gain phase 1502 is switched with rest phase 1402 of FIG. 14 and S1 is fully conducting, it can cause a relatively smooth output voltage at terminal Vout with an overall gain of one half (½) of the input voltage provided at terminal Vin.

Figure 16:
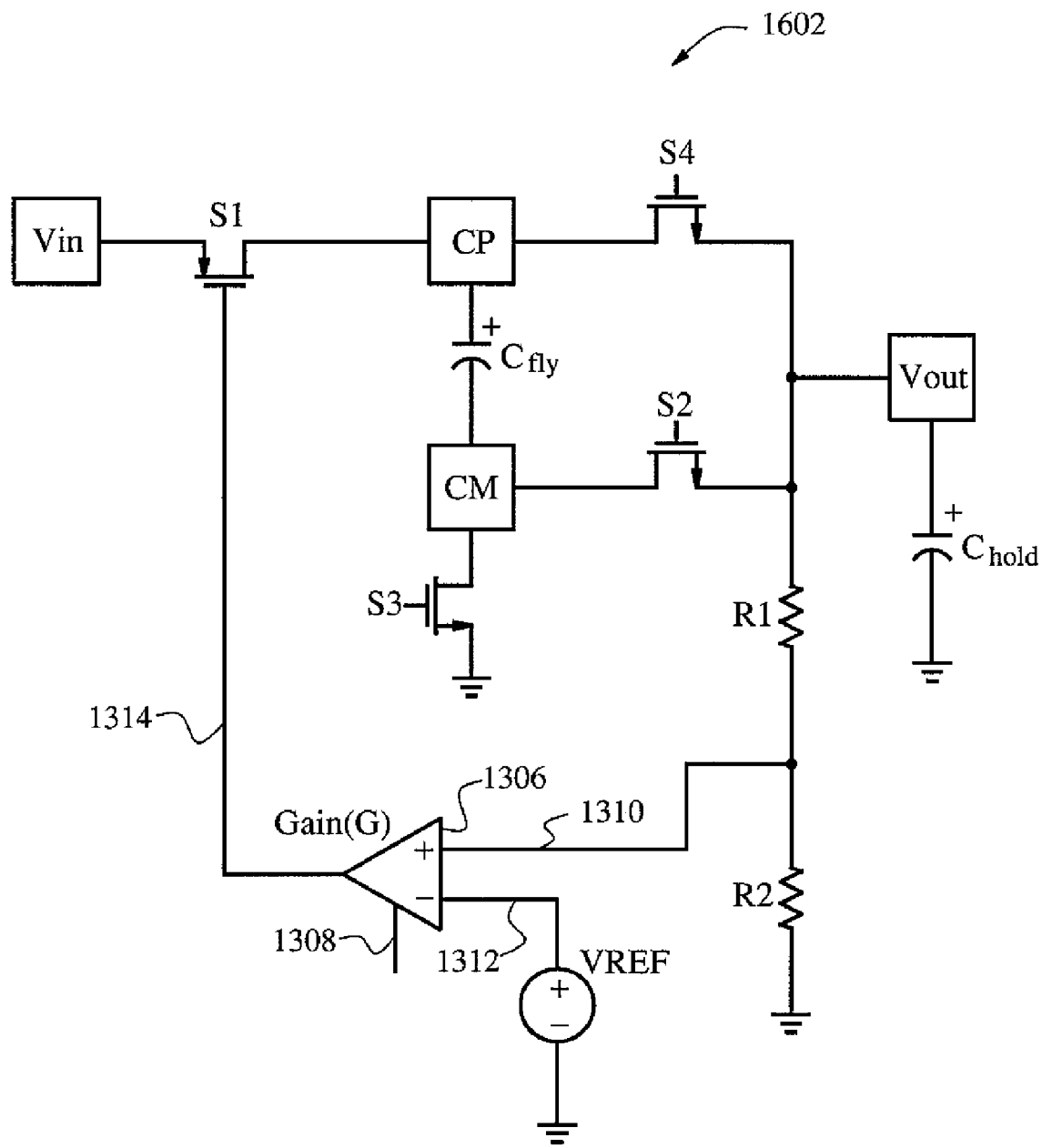
FIG. 16 illustrates an exemplary gain phase of unity gain of the circuit of FIG. 13A.

FIG. 16 illustrates gain phase 1602 of the circuit shown in FIG. 13A, which provides unity gain. Switch S2 is open/non-conducting, switches S3 and S4 are closed/conducting, operational amplifier 1306 of the regulation sub-circuit is one or enabled, and switch S1 is at least partially closed/conducting so that capacitors Cfly and Chold are connected in parallel between a voltage at the output of switch S4 and ground. In this way, FIG. 16 shows the circuit of FIG. 13A configured as a relatively linear voltage regulator.

In one embodiment, circuit 1302 of FIG. 13A is operated continuously in gain phase 1602 of FIG. 16. In another embodiment, circuit 1402 of FIG. 14A is switched between the phase of FIG. 14 and the gain phase of FIG. 16. For example, if the load at output voltage terminal Vout is relatively small, switching between the phases shown FIGS. 14 and 16 can stabilize the regulation sub-circuit and provide a relatively smoother and/or constant output voltage at light loads.

In one embodiment, the circuit can be switched from the phase of FIG. 14 to that of FIG. 16 if an output voltage at terminal Vout falls below threshold value Vt1. Similarly, the circuit can be switched from the phase of FIG. 16 to that of FIG. 14 if an output voltage at terminal Vout rises above threshold value Vt2. Vt2 can be greater than or equal to Vt1, Also, Vt2 can be greater than or equal to a desired (e.g., mean or nominal) voltage, and Vt1 can be less than or equal to the desired (mean or nominal) voltage, for example 1.5 volts.

In one embodiment, the circuit of FIG. 13A can be regulated, for example in the one-half and unitary gain and rest phases as shown in FIGS. 14-16, using one or more different regulation techniques such as PFM, PWM, CTM, and other techniques, using circuitry in addition to or in place of part or all of the regulation sub-circuit components.

Figure 13B:
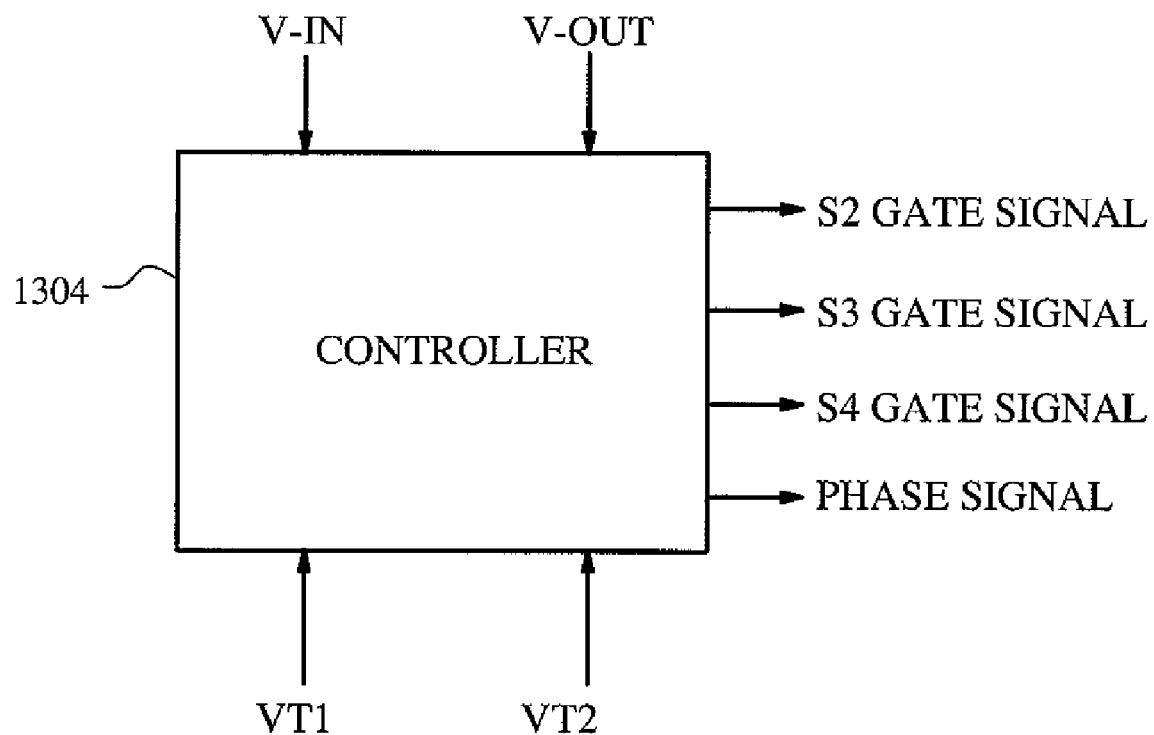
FIG. 13B illustrates an exemplary controller that can be used with the switching circuit of FIG. 13A.

FIG. 13B illustrates controller 1304 that can be used with the circuit shown in FIG. 13A. Controller 1304 receives an input voltage signal at terminal V-IN that corresponds to the input voltage present at or applied to the terminal Vin of circuit 1302 in FIG. 13A. Controller 1304 also receives an output voltage signal at terminal V-OUT that corresponds to the output voltage present at or applied to the terminal Vout of FIG. 13A. In addition, controller 1304 can receive reference voltages at terminals VT1 and VT2 that correspond to the reference voltages Vt1 and Vt2 described herein. In addition or alternatively, values corresponding to reference voltages Vt1 and Vt2 can be stored within or external to controller 1304 for reference. In this way, controller 1304 can be arranged to operate independently of external reference voltages. Controller 1304 provides output control signals "S2 GATE SIGNAL", "S3 GATE SIGNAL", "S4 GATE SIGNAL" to the gates of switches S2, S3, and S4, as shown in FIG. 13A. Controller 1304 also outputs a control signal "PHASE SIGNAL" to input 1308 of the operational amplifier 1306 as shown in FIG. 13A. Controller 1304 can thus monitor the input and output voltages, and operate the switches and enable the regulation sub-circuit (e.g. by enabling or disabling operational amplifier 1306) appropriately to switch circuit 1302 of FIG. 13A among the rest and gain phases shown in FIGS. 14-16.

In one embodiment, controller 1304 can be arranged to operate circuit 1302 of FIG. 13A in accordance with the method shown in FIG. 11, in a similar or corresponding fashion as described with respect to circuits shown in FIGS. 1A and 6. The functionality of controller 1304 can be implemented in any of a variety of ways, for example using one or more of an ASIC (Application Specific Integrated Circuit), a programmable logic device, digital circuitry, analog circuitry, software, firmware, processor, controller, and the like.

Exemplary embodiments can employ circuits other than as shown in FIG. 13A, having for example greater or fewer switches and/or capacitors, and having phases that are equivalent or functionally equivalent to all or a subset of the rest and gain phases shown for example in FIGS. 14-16. For example, exemplary embodiments can employ circuits having phases that are Thevenin equivalents of the common rest phase of FIG. 14 and one or more of the gain phases of FIGS. 15 and 16.

The circuits of FIGS. 1A and 6 can also be configured to be operated in a similar fashion to that described with respect to FIGS. 14 and 16. For example, a regulation sub-circuit or loop like that shown in FIG. 13A can be applied to the circuits of FIGS. 1A and 6 to control the conduction of switches S1 and S9 respectively, and an input voltage can be applied to terminal Vin of the common rest phases of FIGS. 2 and 7 simultaneously with an enabling signal to the regulation loop/sub-circuit to achieve same or similar effects to those described with respect to FIGS. 14 and 16.

Those skilled in the art will recognize that various functions and devices described herein, for example the controller 1304, can be variously implemented singly or in combination with software, hardware, and firmware. The firmware can be implemented as a Field Programmable Gate Array (FPGAs, Application Specific Integrated Circuit (ASIC), or any other equivalent or suitable electronic device capable of supporting the described functions. In addition, the various components described herein can be organized, grouped, assembled and manufactured in different ways. For example, components of the circuits can be grouped on or in integrated circuits, circuit boards, device packages, and the like, and can be variously distributed among a plurality of connected components.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed as new and desired to be protected by Letters Patent of the United States is:

1. A switch array circuit, comprising:
    an input terminal for receiving an input voltage signal, wherein the input voltage signal has a voltage level that is greater than another voltage level for an output voltage signal;
    an output terminal for providing access to the output voltage signal;
    three capacitive components that are to be connected to enable each of a plurality of gain phases of one-half, two-fifths and one-third, wherein each of the gain phases are employable to buck the voltage level of the input voltage signal down to the lower other voltage level of the output voltage signal;
    a plurality of switches that are operable to selectively switch the three capacitive components so as to produce the respective gains of one-half, two-fifths and one-third.

2. The circuit of claim 1 wherein there is one switch of the plurality of switches that is of the variable conductivity type and is connected to one capacitive component and between the input and output terminals and further comprising:
    a comparator having one input connected to the output terminal, a second input connected to a source of reference voltage and an output that is connected to the one switch to vary the conductivity of the one switch to control the amount of the input voltage signal that reaches the output terminal.

3. The circuit of claim 1, further comprising a control circuit that is arranged to control the switching of the plurality of switches.

4. The circuit of claim 1, further comprising a regulation loop for the output voltage signal, wherein the regulation loop is arranged to be operative in at least one of PWM, PFM, or CTM modes.

5. The circuit of claim 1, wherein the voltage level of the input voltage signal decreases over time.

6. The circuit of claim 1 wherein the plurality of switches are operable to connect the three capacitive components to be either one of:
    all three capacitors in series with each other between the input and output terminals to produce the gain of one-third;
    one in series with two in parallel between the input and output terminals to produce the gain of two-fifths, and
    either of one in parallel with two in series between the input and output terminals or one in series into two connected in parallel and connected only to the input terminal to produce the gain of one-half.

7. The circuit of claim 1, wherein the separate gain for each of the plurality of gain phases is at least one of one-half, two-fifths, one-third, two-thirds, or unity.

8. The circuit of claim 1, further comprising at least one of a battery or a line power supply to provide the input voltage signal.

9. The circuit of claim 1, further comprising a modulation component for modulating the input voltage signal, wherein the modulation is based in part on at least one factor that includes at least one of the input voltage signal, output voltage signal, load, or an output impedance.

10. The circuit of claim 1, wherein the circuit has a common rest phase that enables the storing of charge for at least a portion of the plurality of gain phases, the switching between the common rest phase and the one of the plurality of gain phases is based at least in part on at least one factor that includes at least one of the input voltage signal, output voltage signal, load, or an output impedance.

11. The circuit of claim 10, wherein if at least the one factor changes, another gain phase is selectively configured to enable the output voltage signal to be regulated at the predetermined value.

12. The circuit of claim 10, further comprising an output capacitive component connected between the output terminal and a point of reference potential to enable a charge to be stored during the common rest phase that is reusable in switching to at least one of the plurality of gain phases.

13. The circuit of claim 1 further comprising:
a capacitive component connected between the output terminal and a point of common potential; and
wherein the switching of the plurality of switches is operated to connect all of the three capacitive components between the output terminal and the point of common potential across the output capacitive component during a common rest phase of the circuit which enables storing a portion of the charge for at least one of the three capacitive components.

14. The circuit of claim 13 wherein the three capacitive components are connected with one in parallel with two in series between the output terminal and the point of reference potential.

15. A method for regulating an output voltage signal at an output terminal, comprising:
receiving an input voltage signal at an input terminal, wherein the input voltage signal decreases in level over time and has a voltage level that is greater than another voltage level for the output voltage signal
selecting one of a plurality of gain phases that each have a separate gain, wherein each of the gain phases are employable to buck the voltage level of the input voltage signal down to the lower other voltage level of the output voltage signal, and wherein the plurality of gain phases are based at least in part on a plurality of capacitive components that are configurable;
employing a plurality of switches and three capacitive components; and
operating the plurality of switches to selectively switch the three capacitive components to provide the plurality of gain phases so as to produce respective gains of one-half, two-fifths and one-third and a common rest phase, and
providing access to the output voltage signal at an output terminal.

16. The method of claim 15, further comprising a regulation loop for the output voltage signal, wherein the regulation loop is arranged to be operative in at least one of PWM, PFM, or CTM modes.

17. The method of claim 15, wherein there are only three capacitive components and each of the plurality of gain phases are associated with a separate gain that is at least one of one-half, two-fifths, one-third, two-thirds, or unity.

18. The method of claim 15, further comprising controlling which of the plurality of gain phases is enabled to buck the voltage level of the input voltage signal based at least in part on one of the input voltage signal, output voltage signal, load, or an output impedance.

19. The method of claim 15, wherein the plurality of switches are operated to be either one of:
all in series with each other between the input and output terminals to produce the gain of one-third,
one in series with two in parallel between the input and output terminals to produce the gain of two-fifths, and
either of one in parallel with two in series between the input and output terminals or one in series with two connected in parallel and a connection only to the input terminal to produce the gain of one-half.

20. The method of claim 15 wherein one switch of the plurality of switches that is of the variable conductivity type and is connected to one capacitive component and between the input and output terminals and further comprising:
providing a comparator having one input connected to the output terminal, a second input connected to a source of reference voltage and an output that is connected to the one switch; and
varying the conductivity of the one switch to control the amount of the input voltage signal that reaches the output terminal.

21. The method of claim 15, further comprising controlling the switching of the plurality of switches based at least in part on one of the input voltage signal, output voltage signal, load, or an output impedance.

22. The method of claim 21, further comprising modulating the input voltage signal based at least in part on the at least one factor.

23. The method of claim 15 wherein there is a capacitive component connected between the output terminal and a point of common potential; and
wherein the switching of the plurality of switches is operated to connect all of the three capacitive components between the output terminal and the point of common potential across the output capacitive component during a common rest phase of the circuit which enables storing a portion of the charge for at least one of the three capacitive components.

24. The method of claim 23 wherein the plurality of switches are operated so that the three capacitive components are connected with one in parallel with two in series between the output terminal and the point of reference potential.

* * * * *

UNITED STATES PATENT AND TRADEMARK OFFICE
CERTIFICATE OF CORRECTION

PATENT NO.        : 7,456,677 B1
APPLICATION NO.   : 11/381101
DATED             : November 25, 2008
INVENTOR(S)       : Arun Rao et al.

It is certified that error appears in the above-identified patent and that said Letters Patent is hereby corrected as shown below:

On the Title page, in Item (56), under "Other Publications", in column 2, line 3, delete "Sympoisum/" and
insert -- Symposium/ --, therefor.

On the Title page, in Item (56), under "Other Publications", in column 2, line 4, delete "Deisgn," and
insert -- Design, --, therefor.

In column 5, line 1, after "example" delete "by" and insert -- be --, therefor.

In column 10, line 17, delete "one" and insert -- on --, therefor.

In column 11, line 37, delete "(FPGAs," and insert -- (FPGAs), --, therefor.

In column 14, line 21, in claim 20, delete "switch;" and insert -- switch: --, therefor.

Signed and Sealed this

Twenty-fourth Day of February, 2009

JOHN DOLL
*Acting Director of the United States Patent and Trademark Office*